FORCE REBALANCE SERVO SYSTEM INCLUDING A UNIQUE TWO WIRE TRANSMISSION LINE AND TRANSISTOR CONTROL CIRCUIT

Filed Aug. 7, 1967

INVENTORS.
WILLIAM F. NEWBOLD
RICHARD J. SPADY
JAMES A. HOGAN
BY
Lockwood D. Burton
ATTORNEY.

United States Patent Office 3,544,876

Patented Dec. 1, 1970

3,544,876

FORCE REBALANCE SERVO SYSTEM INCLUDING A UNIQUE TWO WIRE TRANSMISSION LINE AND TRANSISTOR CONTROL CIRCUIT

James A. Hogan, Hatfield, William F. Newbold, Springfield Township, Montgomery County, and Richard J. Spady, Feasterville, Pa., assignors to Honeywell Inc., Minneapolis, Minn., a corporation of Delaware Filed Aug. 7, 1967, Ser. No. 658,701
Int. Cl. G05d *15/01*
U.S. Cl. 318—675 7 Claims

ABSTRACT OF THE DISCLOSURE

There has been provided, in accordance with the present invention, a position-to-current transducer or signal transmitter which includes a controlled amplitude transistor oscillator which operates at a substantially constant frequency. A special detector circuit is provided which includes, effectively, a variable A.C. bridge followed by a D.C. bridge. The A.C. bridge includes the essential tuning elements of the oscillator. The output of the D.C. bridge is connected, through a transistor amplifier, to a power supply circuit. Connected in series with the power supply circuit is a mechanical feedback unit as well as an output load device, thus preserving the highly desirable two wire transmission characteristics.

Figure 1:
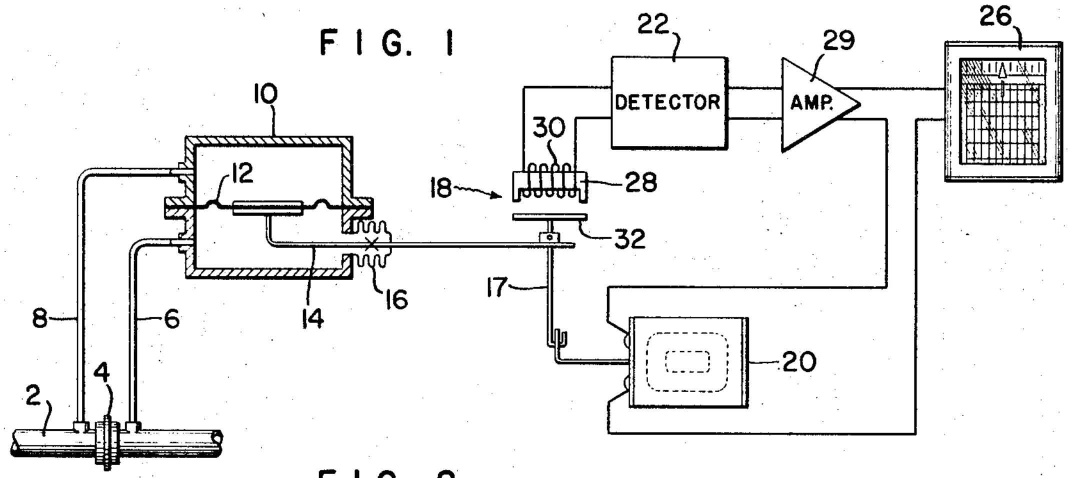

The present invention relates to electronic apparatus, and more particularly to an electronic position-to-signal transducer and signal transmitter.

In the field of electronic process control systems, means have been provided for converting some measured process-variable, which is measured in terms of a change in position of a mechanical member, into a corresponding electric signal. In relatively crude systems, that conversion may simply be the adjustment of a variable resistor directly by the mechanical member. However, as the control systems become more refined and sophisticated, the conversion becomes more demanding in regard to precision, reliability and stability. One form of improved transducer of this type is shown in U.S. Pat. 2,847,625. In that patent, there was shown a transistor oscillator with the mechanically movable element coupled to a variable impedance element in the oscillator feedback path. Variations of that impedance element caused variations in the amplitude of oscillation of the oscillator. That, in turn, caused variations in the current drawn by the oscillator from the power supply means. Therefore, a load, or output, device connected in series with the power supply and the oscillator, was supplied with variable current signals which were representative of the input mechanical motion. The foregoing was accomplished with only two wires, one pair, passing between the load and the transducer, i.e. so-called two-wire transmission.

As the art has advanced, the demands on the transducers for greater precision, reliability and stability under increasingly adverse conditions has continued to grow.

It is accordingly, an object of the present invention to provide an improved position-to-current transducer and signal transmitter which constitutes a substantial advancement in the art over prior art transducers.

It is another object of the present invention to provide an improved transducer transmitter which features greater interchangeability of components and repeatability of performance; hence, greater facility of manufacture.

It is a further object of the present invention to provide an improved transducer as set forth which features improved linearity and predictability and can be more readily compensated for temperature variations.

A still further object of the present invention is to provide an improved transducer as set forth which is characterized in greater stability and reliability under a greater range of ambient temperature and supply voltage and which is further characterized in greater flexibility of use and application.

In accomplishing these and other objects, there has been provided a position-to-current transducer or signal transmitter wherein a transistor oscillator is operated at a substantially constant frequency and amplitude. Means responsive to an input force is provided for variably dividing the oscillatory output signal from the oscillator. This is followed by the conversion means for converting the variably divided oscillatory signal into a correspondingly varied D.C. signal. That D.C. signal is then applied to control the current in a series circuit including a remote power supply and a load device as well as a feedback or force-balance, element coupled to oppose the input force.

Figure 2:
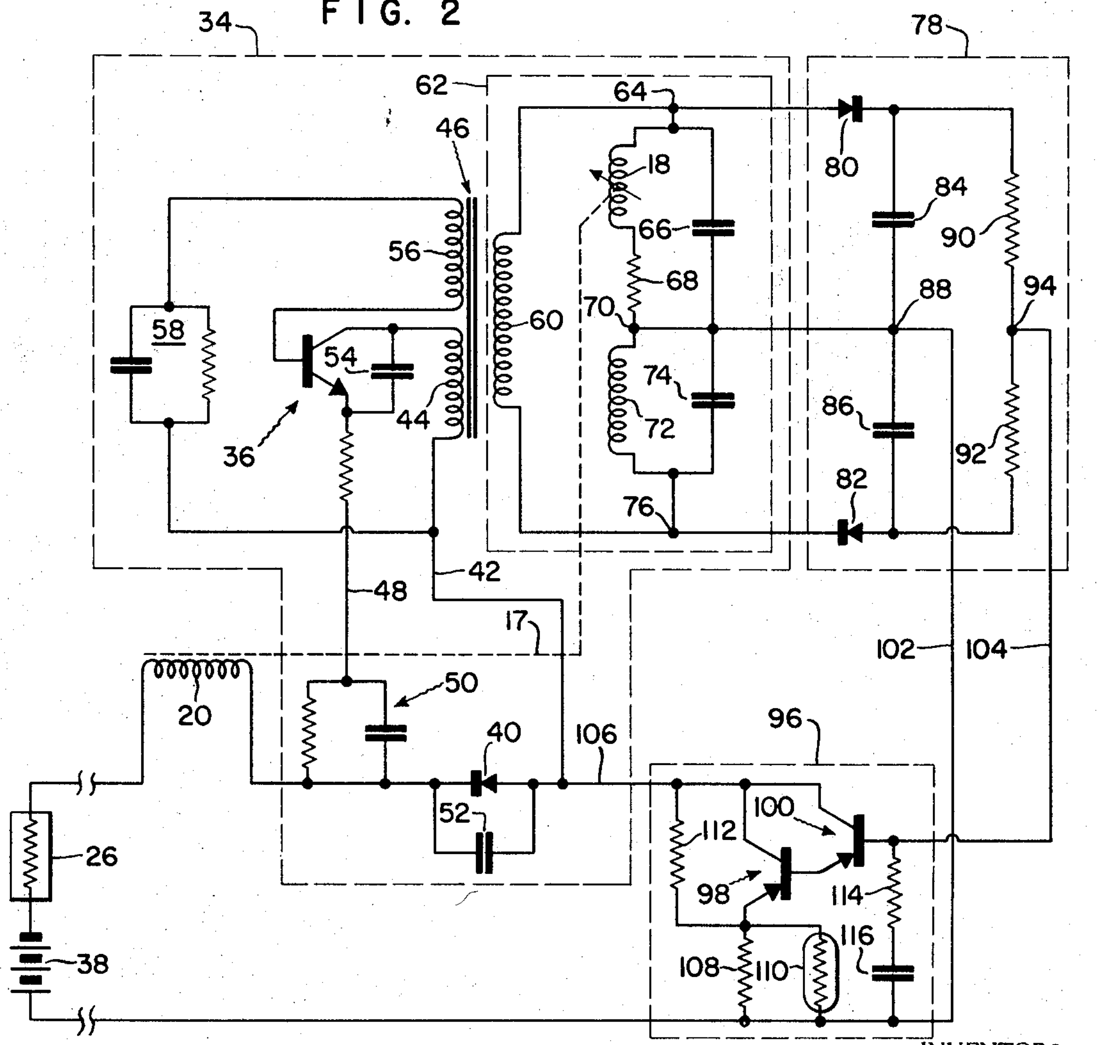

A better understanding of this invention may be had from the following detailed description when read in connection with the accompanying drawings, in which:

FIG. 1 is a schematic representation of a system embodying the present invention; and FIG. 2 is a schematic circuit diagram of an embodiment of the present invention.

Referring now to the drawings in more detail there is shown in FIG. 1 an exemplary system in which the improved transducer/transmitter, of the present invention is incorporated. A process under control is represented by a flow line 2 through which a fluid may be assumed to be flowing. The flow line includes a conventional orifice plate for producing a differential pressure on opposite sides thereof which is a function of the flow rate. The differential pressure thus produced is applied through a pair of pressure take-off connections 6 and 8 to a differential pressure detector 10. The differential pressure detector 10 characteristically comprises a chamber divided into two compartments by a movable diaphragm 12; the two pressure take-off connections being connected, respectively, to the two compartments. A movable arm 14 is mechanically coupled to the movable diaphragm 12 and passes, through a flexible seal 16, to the exterior of the chamber. The end of the arm 14 remote from the detector 10 is mechanically coupled by a linkage 17, first, to a variable inductive, or reactive, impedance member 18 and, second, to a force-balance, or negative feedback, member 20.

The inductive impedance element 18 is electrically connected in a detector circuit 22 which will be described in more detail hereinafter. The output signal from the detector 22, a direct current signal, is applied as input signal to a D.C. amplifier 24. The amplifier 24, in turn, has its output circuit connected to the series arrangement of the feedback member 20 and an output load device such as the illustrated recording indicator 26 which may be included in a remotely located central control station. The power supply for the entire electrical system, thus described, is included at the central station and/or within the housing for the recording indicator 26, and, as will be more clearly seen hereinafter, is also connected in the series loop constituting the output circuit of the amplifier 24.

In operation, the system described in connection with FIG. 1 functions as follows. Fluid substance flowing through the flow line 2 causes a differential pressure to be developed across the orifice plate 4 which is a function of the rate of flow of the fluid through the flow line 2. The differential pressure thus developed is applied by the pressure take-off connections 6 and 8 respectively to the two compartments of the differential pressure detector 10. The differential pressure applied to the two compartments of the differential pressure detector 10 tends to cause the movable diaphragm 12 to move in a direction depending upon the relative magnitude of the pressures applied to the two compartments, respectively. The motion of the diaphragm is transmitted by the rod 14 and the connecting linkage 17 to the variable inductance member 18. As in the aforementioned Pat. No. 2,847,625, the variable inductance element 18 includes a relatively fixed core member 28 having an inductance winding 30 thereon, and a relatively movable armature 32. As the armature is moved toward or away from the core, the reactive impedance of the element 18 changes correspondingly. Such variations in the reactive impedance of the element 18 causes a corresponding variation in the D.C. output signal from the detector 22, and hence in the output current signal from the amplifier 24. This variation in output current passing through the control circuitry of the recording indicator 26 causes the recording and indicating elements thereof to move in accordance with the varying signal in a conventional manner. The same variations in amplifier output current are also passed in series through the coil of the force-balance, or feedback, member 20. This force-balance or feedback, member 20 may be of the type of element shown in Shafer Pat. 2,847,619. The output current from the amplifier passing through the element 20 tends to cause that element to move in such a direction as to oppose, through the interconnecting linkage 17 the motion or force, initiated by the differential pressure detector 10. With the input force from the differential pressure transducer being opposed by the force from the feedback element, the armature of the inductor element will be allowed to move to a stable position at which the resultant current produces a feedback force which is exactly equal to the input force. Since this system is, therefore, a force-balance closed-loop system and the current through the coil of the element 20 is that which is necessary to oppose and balance the force introduced by the differential pressure detector 10, it is apparent that the output current of the amplifier will, of necessity, be proportional to the differential pressure signal applied to the detector 10.

In FIG. 2 there is shown a schematic diagram of the circuitry represented by the detector element 18, the feedback member 20, the detector 22, and the amplifier 24 all shown in block diagram in FIG. 1. The detector includes an oscillator 34 which has for its active element a transistor 36. The power supply for the system, which was described in connection with FIG. 1 as being within the housing of the recording indicator 26, is here represented by the battery 38. In the series circuit around the battery 38, which will be discussed in more detail hereinafter, there is included a constant-voltage device represented by the diode 40. In actual practice the device 40 may comprise a semiconductor device characterized as a series of semiconductor diodes which provides a substantially constant voltage-drop, in the forward conductive direction, notwithtanding variations, within a relatively limited range, in current. Such devices are marketed under the name stabistor by the Texas Instrument Company. Within the range of current variations contemplated in this system, the device 40 provides a substantially constant voltage supply to energize the oscillator 34. While these devices do not develop an absolutely constant voltage drop thereacross, the voltage developed is, within the frame of reference and for the purpose of this system, substantially constant and will be referred to herein as a constant voltage device. Accordingly, a first supply lead 42 is connected from the positive side of the device 40, through a primary winding 44 of a transformer 46, to the collector of the transistor 36.

The emitter of the transistor 36 is connected through a lead 48 and a RC bias network 50 to the negative side of the constant voltage device 40. A by-pass capacitor 52 is connected to provide a low impedance path around the device 40 for any high frequency energy that may be present on the line. A damping capacitor 54 is connected between the collector and emitter of the transistor 36 to damp out spurious high frequency oscillations in the oscillator circuit. The base of the transistor 36 is connected through a feedback winding 56 on the transformer 46, then through the parallel RC bias network 58 to the lead 42.

An output secondary winding 60 of the transformer 46 has its terminals connected across a pair of terminals of an A.C. bridge 62 which constitutes the tuned circuit of the oscilaltor 34. The A.C. bridge includes a pair of serially connected parallel-resonant LC circuits. A first terminal 64 of the A.C. bridge is connected to the parallel arrangement of a capacitor 66 in parallel with the variable inductance element 18. A small resistor 68 is connected in series with the variable inductance member 18 and is connected with the capacitor 66 to an intermediate terminal 70 completing the first of the parallel-resonant tuned circuit. The second parallel-resonant tuned circuit includes a fixed inductor 72 connected in parallel with a capacitor 74 and both connected between the intermediate terminal 70 and the terminal 76; the terminals 64 and 76 being connected to the ends of the secondary winding 60 of the transformer 46.

The A.C. bridge thus described is connected, in turn, to a D.C. bridge 78. The D.C. bridge 78 includes a first rectifying diode 80 serially connected to the terminal 64 of the A.C. bridge, and a second rectifying diode 82 serially connected to the terminal 76 of the A.C. bridge but connected in opposite polarity relationship with respect to the diode 80. A pair of matched capacitors 84 and 86, respectively, are serially connected between the terminals of the diodes 80 and 82 which are remote from the A.C. bridge terminals 64 and 76 respectively. The junction 88 between the capacitors 84 and 86 is directly connected to the intermediate terminal 70 of the A.C. bridge. A pair of serially connected resistors 90 and 92, respectively, are connetced in parallel with the serially connected capacitors 84 and 86, respectively. Output signals from the D.C. bridge are taken between the junction 88 between the capacitors 84 and 86 and the junction 94 between the resistors 90 and 92.

The output of the D.C. bridge 78 is applied as input signal to a transistor D.C. amplifier 96. A first and a second transistor 98 and 100, respectively, connected as a Darlington pair, constitutes the active elements of the D.C. amplifier. The junction 88 of the D.C. bridge 78 is connected by a common lead 102 to the positive terminal of the power supply 38. The junction 94 of the D.C. bridge is connected by a lead 104 to the base of the transistor 100. The emitter of the transistor 100 is directly connected to the base of the transistor 98. The collectors of the transistors 98 and 100 are connected together and to an output lead 106. The emitter of the transistor 98 is connected through a biasing network, including a fixed resistor 108 and a temperature sensitive resistor 110, to the common lead 102, the resistors 108 and 110 being connected in parallel. A further resistor 112, connected in series between the output lead 106 and the bias resistor 108, is arranged to provide initial starting current for the constant voltage device 40. Connected in series between the output lead 106 of the amplifier 96 and the power supply 98 is the aforementioned constant voltage device 40, the winding of the force-balance, or feedback, device 20, and the output load device 26, here represented as a resistor in a block.

Because the system herein described is a closed-loop system including the mechanical interconnections and substantial forward gain, it has been found desirable to include a compensation circuit, comprising a resistor 114 and a capacitor 116 serially connected across the inputs to the amplifier 96, between the leads 104 and 102, respectively.

Operation of this circuit is initiated by closing a main power supply switch (not shown). With the application of power to the circuit, current initially flows through the resistors 108 and 112 to supply an initial current through the constant voltage device 40. With the development of a voltage across the element 40, the transistor oscillator 34 is energized and begins oscillating at a frequency determined by the resonant circuits in the A.C. bridge 62. While the upper and lower parallel-resonant circuits in the A.C. bridge 62 are nominally tuned to the same frequency, the presence of the resistor 68 in the upper resident circuit has the effect of widening the Q of that upper resonant circuit. With the Q of the upper resonant circuit thus widened, the predominate control of the frequency of oscillation is effected by the resonant frequency of the lower of the two resonant circuits, that is, that resonant circuit including the inductor 72 and the capacitor 74. Thus, even though the tuning of the upper resonant circuit may be varied through variations in the variable inductor 18, the frequency of oscillation remains substantially constant. Similarly, since the oscillator is energized from a substantially constant voltage source, i.e. the voltage control device 40, the amplitude of oscillation also remains substantially constant. If the variable inductor 18 is so adjusted that the resonant frequency of the upper resonant circuit is the same as the resonant frequency of the lower resonant circuit, then the signal appearing between the terminals 64 and 70 will be equal to the signals appearing between the terminals 70 and 76.

In the D.C. bridge the capacitors 84 and 86 are of equal value. The signals constituting the outputs of the A.C. bridge are rectified by the diodes 80 and 82 and applied in opposite sense as charge on the capacitors 84 and 86. The resistors 90 and 92 comprise the other two legs, respectively, of the D.C. bridge. If the resistors 90 and 92 were of equal value, a balanced signal as described, applied from the A.C. bridge would result in a zero potential difference across the junctions 88 and 94. However, in order to provide the necessary initial bias to operate the amplifier 96 in the desired manner corresponding to zero signal condition, the resistor 92 is of a smaller value than that of the resistor 90 by an amount necessary to produce the desired operating characteristics for the amplifier 96.

If, now, the system input signal, that is, for example, the differential pressure described in connection with FIG. 1 were to change, the position of the armature of the variable inductance element 18 would be changed accordingly. This would result in a change in the inductive impedance of the upper of the two resonant circuits. Since the total energy applied across the terminals 64 and 76 remains substantially constant, the variation in the tuning or reactive impedance of one of the two resonant circuits causes the relative division of that energy to shift. That is, the signal developed between terminals 64 and 70 will not be equal to the signal developed between the terminals 70 and 76. In this configuration, the two resonant circuits act as a variable signal divider. Therefore, an unbalance signal is presented as input signal to the D.C. bridge 78. When this unbalance signal is rectified by the diodes 80 and 82 respectively, and applied as charge across the capacitors 84 and 86, respectively, that unbalance signal will result in a change in the potential difference across the junctions 88 and 94, respectively. This in turn, produces a change in the input signal to the amplifier 96.

The amplifier 96 actually serves two fundamental purposes. First, it supplies the necessary signal gain to produce a signal of sufficient magnitude to effect the desired control in the output instrumentality. Second, it converts the voltage signal which appears across the leads 102 and 104 into a controlled current signal. This resulting current passes through the constant voltage unit 40, through the force-balance, or feedback, number 20 and through the output load device 26. Both the feedback element 20 and the output load device 26 are instrumentalities designed to respond to current signals rather than voltage signals.

As previously described in connection with FIG. 1, the current through the feedback device 20 applies a force through the interconnection linkage 17 to the armature of the variable inductance element 18 in opposition to the force applied, for example, by the differential pressure detector. Since this is a closed-loop system, the two opposing forces applied to the armature of the variable inductance device 18 will stabilize at a point of equilibrium at a position whereat the resultant current flowing in the output circuit of the amplifier is proportional to the differential pressure input signal. That same current flowing in the output circuit of the amplifier 96 also passes through the output load device 26 which may, as hereinbefore suggested, be a recording indicator. On the other hand, the output device 26 may be any sort of current responsive instrumentality useful in the control instrumentation field.

It may be seen that there is a series circuit provided which includes the power supply 38, the controlled path through the amplifier 96, the constant voltage device 40, the feedback device 20 and the output load device 26. Since the power supply 38 is constant and both the load device 26 and the feedback device 20 present constant impedances to the flow of current the only variable in the series circuit is the control path of the amplifier 96. Accordingly, the amplifier 96 may be considered as a variable impedance and the series circuit which varies under the control of the control signal applied across the input leads 102 and 104 thereof and controls the magnitude of the current flowing in the series circuit. Inasmuch as the system operates as a series circuit responsive to controlled current, it is apparent that the power supply 38 and the load device 26 may be located at a considerable distance from the transducer without the necessity of considering line transmission loss as would be necessary if the load and feedback devices were voltage sensitive devices.

Inasmuch as the amplifier 96 is a distinct and separately identifiable element from the oscillator-detector combination, temperature compensation for the entire system may be accomplished through the use of the temperature sensitive resistor 110 in the emitter circuit of the transistor 98. Also because of the unique combination, the RC damping circuit including the resistor 114 and the capacitor 116 may be employed to stabilize the system whereas in prior art devices it has been necessary to use mechanical damping in connection with the movable elements.

Whereas in the previous transducers, the transistor element was required to provide both the signal gain and the oscillatory operation as well as the change detection, the circuit parameters were quite critical. In the present system, the separately identifiable oscillator and amplifier permit of considerably greater tolerance in selection of components without impairing the operation of the system. Since, in the system, is is passive network means which respond to the input force to develop an output signal, the system features substantially improved linearity, reliability and precision.

Since the energization of the oscillator is derived from the voltage developed across the constant voltage device 40, a fixed voltage level will be provided for the operation of the oscillator completely independently of the power supply voltage. Similarly, the amplifier, being a current control device, is made to control the current flow between preestablished limits such as 4–20 ma., this too, independently of the power supply voltage.

The embodiments of the invention in which an exclusive property or privilege is claimed are defined as follows:

1. A transmitter adapted to send a D.C. line signal over a two wire transmission line to a central station which includes a D.C. power supply connected to said transmission line for energizing said transmitter; said transmitter comprising a constant amplitude transistor oscillator having an output circuit, including a pair of output terminals, reactive impedance means including a parallel tuned circuit connected in said output circuit of said oscillator across said output terminals, said parallel tuned circuit including a fixed and a variable reactive element in one leg thereof, the junction between said fixed and variable reactive element comprising an intermediate reference terminal between said output terminals of said oscillator, a portion of said reactive impedance means being adjustable in response to an input force, said reactive impedance means comprising a signal divider means for variably dividing the oscillatory output signal of said oscillator in accordance with said input force, conversion means for converting the divided output of said oscillator to a unidirectional signal which varies in accordance with the variations in division of said oscillatory signal, a transistor D.C. amplifier connected to be controlled by said unidirectional signal and having a controlled current output path, and output circuit means connecting said output path in series with said two wire transmission lines for controlling the current flowing in said transmission lines.

2. A transmitter as set forth in claim 1 wherein said conversion means includes a D.C. bridge circuit, rectifying means coupling said D.C. bridge circuit to said signal divider means.

3. A transmitter as set forth in claim 1 wherein a force-balance feedback unit is electrically connected in said series circuit including said two-wire transmission line, said feedback unit being mechanically coupled to said adjustable portion of said reactive impedance means whereby to oppose said input force.

4. The invention as set forth in claim 3 and characterized by the inclusion in said series circuit of a substantially constant voltage-drop device for developing a substantially constant voltage thereacross from the current flowing in said series circuit, and means connecting the input of said oscillator across said device whereby said oscillator is energized only by power derived from said two wire transmission line.

5. A transmitter adapted to send a D.C. line signal over a two-wire transmission line to a central station which includes a D.C. supply connected to said transmission line for energizing said transmitter; said transmitter comprising a transistor oscillator including a transistor having a base, a collector and an emitter, a coupling transformer having a primary winding connected in the emitter-collector circuit of said transistor, a feedback winding on said transformer connected in the base-collector circuit of said transistor, and an output secondary winding on said transformer, said secondary winding having a first and a second oscillator output terminal, a parallel tuned resonant circuit means connected between said first and second oscillator output terminals, said resonant circuit comprising the principal frequency determining means of said oscillator, said resonant circuit means including a first and a second resonant portion each having a capacitor and an inductor in parallel, said first and second portions being connected in series between said oscillator output terminals, said inductor of said first portion being variable in response to an input force to vary the reactive impedances of said first portion; a D.C. bridge circuit including a first and a second capacitor as two of the legs of said bridge and a first and a second resistor as the third and fourth legs of said bridge, said capacitors of said D.C. bridge being of equal value, the junction between said first and second portion of said resonant circuit means and the junction between said first and second capacitors of said bridge being connected to one of the two wires of said two-wire transmission line comprising a system common reference lead; a first rectifying diode connected between said first oscillator output terminal and the junction between said first capacitor and said first resistor of said bridge, a second rectifying diode connected between said second oscillator output terminal and the junction between said second capacitor and said second resistor of said bridge; a transistor D.C. amplifier, an input circuit means for said amplifier including means connecting the junction between said first and second resistor of said bridge circuit to said amplifier whereby to develop an input signal for said amplifier between said last named junction and said common reference lead, an output circuit for said amplifier connected in a series circuit with said two-wire transmission line whereby said transistor amplifier controls the current flowing in said transmission line in accordance said amplifier input signal, said amplifier being energized from said transmission line; a substantially constant voltage-drop device connected in said series circuit for developing a substantially constant voltage thereacross, means connecting the input circuit of said oscillator across said device whereby said oscillator is energized only by power derived from said two-wire transmission line; and current responsive force-balance feedback means connected in said series circuit, said feedback means being responsive to the controlled current flowing in said transmission line and being mechanically coupled to said adjustable inductor whereby to oppose said input force.

6. The invention as set forth in claim 4 and characterized by the inclusion in said D.C. amplifier of temperature compensating means whereby compensation is provided for said transmitter for variations in operation due to temperature variations.

7. The invention as set forth in claim 4 and characterized by the inclusion of a damping circuit, including a serially connected resistor and capacitor, connected across the input to said amplifier whereby to damp-out spurious system oscillations.

References Cited

UNITED STATES PATENTS

| | | | |
|---|---|---|---|
| 3,114,089 | 12/1963 | Mulligan | 318—31 |
| 3,172,950 | 3/1965 | Muller | 318—22X |
| 3,182,241 | 5/1965 | Ollivier et al. | 318—31 |
| 3,213,694 | 10/1965 | Clark et al. | 318—32X |
| 3,322,971 | 5/1967 | Liu | 307—296X |
| 3,376,482 | 4/1968 | Barthel | 318—22X |

THOMAS E. LYNCH, Primary Examiner

U.S. Cl. X.R.

307—296; 318—687